(12) United States Patent
Stewart

(10) Patent No.: US 7,128,938 B2
(45) Date of Patent: *Oct. 31, 2006

(54) METHOD OF PHOTOCOPYING AN IMAGE ONTO EDIBLE MATERIAL FOR DECORATING ICED BAKED GOODS

(75) Inventor: Douglas R. Stewart, Fort Gratiot, MI (US)

(73) Assignee: Jack Guttman, Inc., West Chester, OH (US)

( * ) Notice: Subject to any disclaimer, the term of this patent is extended or adjusted under 35 U.S.C. 154(b) by 621 days.

This patent is subject to a terminal disclaimer.

(21) Appl. No.: 10/428,215

(22) Filed: May 2, 2003

(65) Prior Publication Data

US 2003/0198719 A1    Oct. 23, 2003

Related U.S. Application Data

(60) Continuation of application No. 09/774,518, filed on Jan. 31, 2001, now Pat. No. 6,582,742, which is a continuation of application No. 09/195,768, filed on Nov. 18, 1998, now Pat. No. 6,319,530, which is a continuation-in-part of application No. 09/122,262, filed on Jul. 24, 1998, now Pat. No. 6,652,897, which is a continuation of application No. 08/471,761, filed on Jun. 6, 1995, now abandoned, which is a division of application No. 08/088,125, filed on Jul. 7, 1993, now Pat. No. 6,616,958.

(51) Int. Cl.
  *A23P 1/08*  (2006.01)
  *A23G 3/00*  (2006.01)
  *A23L 1/275*  (2006.01)
  *B41M 1/26*  (2006.01)

(52) U.S. Cl. .................. 426/383; 347/104; 347/106

(58) Field of Classification Search ................ 426/383, 426/87, 104; 347/104, 106, 102
See application file for complete search history.

(56) References Cited

U.S. PATENT DOCUMENTS

| | | |
|---|---|---|
| 2,394,322 A | 2/1946 | McKee |
| 2,895,832 A | 7/1959 | Bersey |
| 3,889,591 A | 6/1975 | Noguchi |
| 4,168,662 A | 9/1979 | Fell |
| 4,285,978 A | 8/1981 | Quinlivan |
| 4,322,449 A | 3/1982 | Voss et al. |
| 4,531,292 A | 7/1985 | Pasternak |
| 4,548,825 A | 10/1985 | Voss et al. |
| 4,578,273 A | 3/1986 | Krubert |
| 4,843,958 A | 7/1989 | Egosi |

(Continued)

FOREIGN PATENT DOCUMENTS

GB          422430          1/1935

(Continued)

OTHER PUBLICATIONS

Shead, J., "*Inks Ain't What They Used to Be*", Confec. Prod. vol. 58, No. 6, Jun. 1992, pp. 410, 415. (abstract only).

(Continued)

*Primary Examiner*—Steve Weinstein
(74) *Attorney, Agent, or Firm*—Wood, Herron & Evans, LLP

(57) ABSTRACT

An iced cake (92) is decorated with an edible substrate sheet (100) having a color image (200) reproduced thereon by a plain paper photocopy process. The sheet (100) is passed along a straight, generally unheated copy path (24) through a plain paper, color inkjet photocopy machine (10) to reproduce thereon the color image (200) placed on the photocopy glass (12).

10 Claims, 2 Drawing Sheets

U.S. PATENT DOCUMENTS

| | | | |
|---|---|---|---|
| 4,859,476 | A | 8/1989 | Herting |
| 4,900,173 | A | 2/1990 | Okamura |
| 4,905,589 | A | 3/1990 | Ackley |
| 4,910,661 | A | 3/1990 | Barth et al. |
| 4,920,421 | A | 4/1990 | Stemmle |
| 4,985,260 | A | 1/1991 | Niaura et al. |
| 5,009,626 | A | 4/1991 | Katz |
| 5,017,394 | A | 5/1991 | MacPherson et al. |
| 5,032,416 | A | 7/1991 | Niaura et al. |
| 5,035,907 | A | 7/1991 | Phillips et al. |
| 5,146,087 | A | 9/1992 | Van Dusen |
| 5,249,062 | A | 9/1993 | Ejiri et al. |
| 5,251,040 | A | 10/1993 | Saito |
| 5,322,380 | A | 6/1994 | Crocker |
| 5,329,295 | A | 7/1994 | Medin et al. |
| 5,334,404 | A | 8/1994 | Garcia et al. |
| 5,757,407 | A | 5/1998 | Rezanka |
| 5,774,155 | A | 6/1998 | Medin et al. |
| 6,058,843 | A | 5/2000 | Young |
| 6,210,731 | B1 | 4/2001 | Brissonneau |
| 6,903,841 | B1 | 6/2005 | Spurgeon et al. .......... 358/1.18 |
| 2005/0088693 | A1 | 4/2005 | Schnoebelen et al. ..... 358/1.18 |

FOREIGN PATENT DOCUMENTS

| | | |
|---|---|---|
| GB | 2291838 | 2/1996 |
| WO | WO 95/01735 | 1/1995 |
| WO | WO 97/27759 | 8/1997 |
| WO | WO 97/43908 | 11/1997 |
| WO | WO 97/49291 | 12/1997 |
| WO | WO 99/48696 | 9/1999 |

OTHER PUBLICATIONS

Supermarket News, May 25, 1998, p. 41 (Dialog Abstract).
Bradshaw, D., "*The Sweet Taste of Good Ink*", Financ. Times. No. 31,305. Nov. 16, 1990, p. 14. (abstract only).
Anonymous, "*Laying It on the Line*", Food Prod. Nov. 1990, pp. 29-30. (abstract only).
Nakanishi, N., "*Future and Present of Edible Film*", Food Packag. (Jpn). No. 5, May 1989, pp. 73-82. (abstract only).
Sweet, P., "*Graphics Enters the Jet Age*", Observer. Sep. 14, 1986, p. 42. (abstract only).
Business Courier Serving Cincinnati, May 29, 1998, p. 6 (Dialog Abstract).
Cincinnati Business Courier Jul. 4, 1997, p. 15 (Dialog Abstract).
Kansas City Star, Aug. 2, 1996, p. B1 (Dialog Abstract).
Bakersfield Californian, Aug. 22, 1998 (Dialog Abstract).
Nine pages of Kopy Jet information printed from previous pages of the website of Kopykake Enterprises, Inc., No Date.
Modern Baking, Mar. 1997, p. 36.
Victoria Advocate, Jun. 25, 1997, "Invention is the Icing on the Cake".

METHOD OF PHOTOCOPYING AN IMAGE ONTO EDIBLE MATERIAL FOR DECORATING ICED BAKED GOODS

RELATED APPLICATIONS

The present application is a continuation of U.S. Ser. No. 09/774,518 filed Jan. 31, 2001 now U.S. Pat. No. 6,582,742, which is a continuation of U.S. Ser. No. 09/195,768 filed Nov. 18, 1998, now U.S. Pat. No. 6,319,530, which is a continuation-in-part of U.S. Ser. No. 09/122,262 filed Jul. 24, 1998 now U.S. Pat. No. 6,652,897, which is a continuation of U.S. Ser. No. 08/471,761 filed Jun. 6, 1995 now abandoned, which is a divisional of U.S. Ser. No. 08/088,125 filed Jul. 7, 1993 now U.S. Pat. No. 6,616,958.

BACKGROUND OF THE INVENTION

I. Field of the Invention

The present invention relates to cake decorations and the like and more particularly to applying images to edible substrate material in sheet form to produce a decoration which can be placed directly onto an iced baked good, e.g., a cake with frosting, and eaten with the baked good.

II. Description of Prior Art

Cake and other baked good decorations are quite popular, especially among children. Such decorations typically consisted of hand-applied icing-based decorations and/or miniature toys placed onto the icing or frosting. More recently, in an attempt to satisfy commercial bakers, attempts have been made at providing mass produced decorations which minimize the need for the time and labor-intensive icing applications. Chief among such attempts is the decorated edible substrate sheet such as shown in U.S. Pat. No. 5,017,394 which is made by a silk screening process. As is well understood, the silk-screen process requires that the desired image be formed into several screens, one for each color. The screens are then used as templates to reproduce the image on the substrate by forcing edible coloring materials through the screen openings. The substrate may be placed on an iced or frosted cake and eaten therewith.

While the silk-screen printing process produces a decoration, that process is still somewhat time and labor-intensive. Moreover, with the silk screen process, the range of decorated designs has been somewhat limited. As the design must be formed into multiple screens, make-ready costs and inventory restraints limit the number of pre-made designs that will be on hand. Additionally, the silk screen process is an inherently low resolution process.

Many consumers are not satisfied with the limited design choices available. Indeed, many consumers would prefer to customize the decorations but cannot readily do so. By way of example, iced or frosted cakes having a decoration that depicts the face of the birthday child would be highly desirable. The silk screen process, however, is economically unsuitable for one-off or custom designs. Instead, such a decoration may be provided by placing the actual photograph or a reproduction thereof onto the icing. But the photograph or reproduction is not edible and so must be removed before the iced cake can be eaten.

An improvement to the photograph has been to provide a costly and complex cake printing system. In such a system, an electronic scanner digitalizes a photographic image, and a separate, electronic computer device drives a printer that sets over the iced cake to form the image directly on the cake. Not only is such a system slow, it requires several costly computer components. Moreover, the icing on the cake must be nearly perfectly flat so as not to impact or foul up the printer mechanism. The task of properly icing a cake for such a device is quite difficult and prone to error requiring greater sophistication on the part of the icer.

SUMMARY OF THE INVENTION

The present invention provides a method and for easily and quickly decorating iced baked goods in a virtually unlimited range of designs customized to the customer's desires. To this end, and in accordance with the principles of the present invention, a plain paper color photocopy machine utilizing inkjet technology to reproduce the image is advantageously applied to the cake decorating art to thereby provide a simple, automatic way to apply a virtually unlimited range of color images to an edible substrate sheet which is then applied to the iced baked good. Thus, a method of decorating an iced baked good is provided by color photocopying a color image placed on the photocopy glass onto an edible substrate sheet passing through the photocopy machine and then placing the decorated sheet onto the iced baked good without concern for ideal placement of the icing on the baked good. The resulting iced baked good with the decorated substrate sheet may be eaten without regard to destruction or removal of the decorated substrate. Yet, the decorated substrate may contain virtually any image desired by the consumer including a depiction of the birthday child, by way of example, without requiring an inventory of different designs, multiple equipment items, highly sophisticated icing talents, or the time, material, and labor of a silk-screen process.

The nature of edible substrate sheets was thought to preclude their use in plain paper photocopy machines. Many edible substrate sheets have a very high moisture content and so would tend to gum-up the paper or copy path of conventional copy machines. Also, most edible substrate sheets are relatively flimsy sheets, and so would not likely survive a pass through the machine along the copy path. Indeed, the copy path in such machines is quite tortuous making them unsuitable for photocopying onto either flimsy or rigid edible substrate sheets. Additionally, color photocopy machines often employ a heating element to fix or dry the ink on the paper. Edible substrate sheets cannot tolerate the high heats involved and so would likely be damaged or destroyed during the photocopy process.

The present invention overcomes these various problems. To this end, and in accordance with one aspect of the invention, where the edible substrate is flimsy and/or has a high moisture content, the edible sheet is mounted to a supporting carrier which is passed along the copy path. With the supporting carrier, the flimsy or high moisture, edible sheet is held together to survive the photocopy process. Moreover, the traction mechanism used to pull the copy paper through the photocopy machine may grab at the leading edge of the paper and/or along the peripheral side edges of the paper. The edible sheet is sized so that it does not project to the leading edge and to the side edges of the carrier such that traction applied thereat will not damage the sheet, nor will the sheet gum up the traction mechanism thereat. To further protect the sheet, a thin polyester silicon adhesive tape may be placed over the leading edge of the sheet and onto the carrier thereat.

In accordance with a further aspect of the present invention, it has been discovered that the inks applied to the edible sheet need not be dried as is the case for conventional inkjet color photocopying. Thus, it is possible to disable the heaters such that the copy path is substantially unheated. As a consequence, the image can be reproduced onto the edible sheet without heating and without, therefore, deleteriously affecting the edible substrate sheet.

In accordance with a yet further aspect of the present invention, it has been discovered that the conventional paper path can be interrupted such that the copy path is substantially straight between where the edible substrate (and carrier, if provided) is inserted and ejected. In this regard, the plain paper color inkjet photocopy machine typically applies the inks to reproduce the image as the copy paper passes along a straight portion of the copy path which then continues in a straight path to the outlet. The reproducer and outlet path are referred to herein as a terminal portion of the copy path. The tortuous path is thus usually provided between the copy paper source, such as a drawer in the machine, and the reproducer mechanism in the terminal copying portion of the copy path. To this end, and in accordance with the yet further aspect of the method, the tortuous copy path is interrupted and a substrate input is defined adjacent the entry to the terminal portion of the copy path such that the edible sheet (and carrier) will traverse a substantially straight copy path so as to enhance survivability of the sheet as it passes through the machine, while also reducing the areas of the machine that could be gummed-up by the edible sheet.

Typical of color inkjet photocopy machines is the use of colored inks that allow for a wide range of vivid color reproductions. Such inks may be used to decorate edible sheets by photocopying in accordance with the present invention where the inks are not toxic. Advantageously, however, food grade inks formulated to be edible and using FDA approved FD&C food coloring are used.

By virtue of the foregoing, there is thus provided a method to easily and quickly decorate iced baked goods such as cakes that is simple, automated, and allows for a wide range of image designs. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of the embodiment given below, serve to explain the principles of the present invention.

DETAILED DESCRIPTION OF THE DRAWINGS

Figure 1:
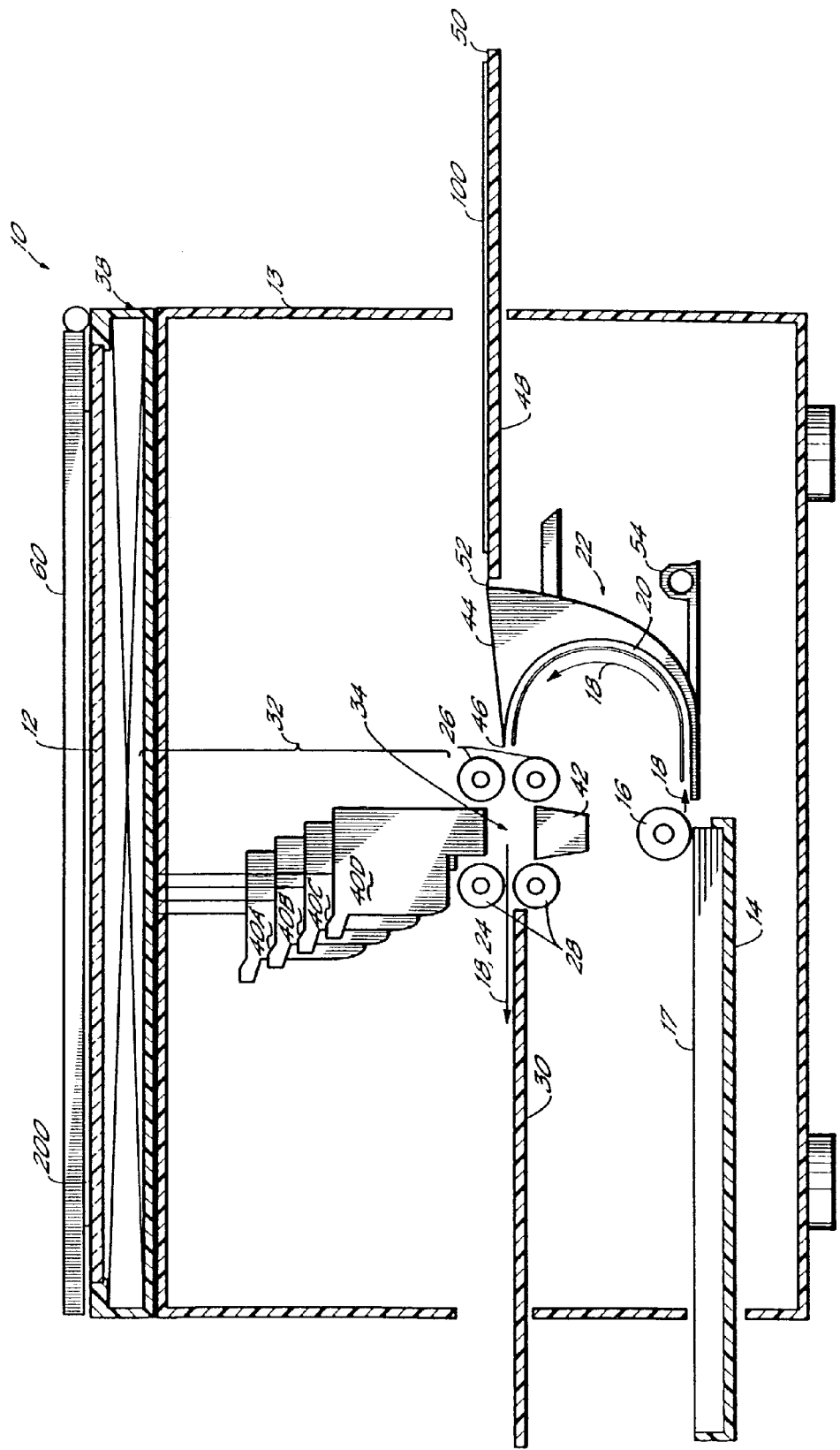
FIG. 1 is a schematic, cross-sectional view of a plain paper color inkjet photocopy machine for decorating edible substrate sheets in accordance with the principals of the present invention.

With reference to FIG. 1, there is shown in schematic form a cross-section of a plain paper color inkjet photocopy machine 10 for decorating an edible web or substrate sheet 100 with any image 200 (including its various colorations) placed on the photocopy glass 12 of machine 10. Machine 10 would conventionally include within its housing 13 a copy paper supply tray 14 with a feed mechanism 16 to feed a sheet of copy paper 17 along tortuous copy path 18 (as represented by arrows 18) which extends from sheet feed mechanism 16 adjacent to tray 14, around a 180° curved or arced section 20 of a guide 22 into a generally straight, terminal copy path segment (represented by arrow 24 of arrows 18). Copy path segment 24 begins at just upstream of traction infed rollers 26, passes through traction outfed rollers 28, and onto paper output or outfed tray 30. An image reproduction system 32 communicates into the area 34 between rollers 26 and 28 whereat the image 200 on glass 12 is caused to be reproduced onto the copy paper in area 34 before the paper is expelled from output rollers 28 onto receiving tray 30.

Image reproducer system 32 is based on a conventional inkjet technology and includes an electronic, computerized image scanning unit 38 which controls a plurality of cartridges 40A, 40B, 40C, and 40D which contain image reproduction materials such as magenta, blue, yellow, and black inks, respectively, such that a wide variety of colors may be applied to substrate 100 while passing through the image reproducer area 34. An example of a suitable photocopy machine 10 is the Hewlett Packard Model 210C copier, which includes an inkjet image reproducer system 32. Terminal copy path segment 24 may also include a heater 42 in area 24 by which to dry the inks 40A, 40B, 40C, and 40D applied by image reproducer system 32.

In accordance with the one aspect of the present invention, an upper alignment surface 44 of guide 22 is utilized to interrupt photocopy path 18 and define a substrate input 46 at the front edge of substrate. A substrate support tray 48 with a flat surface 50 is connected adjacent to the back edge 52 of surface 44 such that substrate sheet 100 will traverse a substantially straight path from tray 48 along upper alignment surface 44 of guide 22 and onto terminal copy path segment 24, and output 28. In this way, edible substrate sheet 100 placed on support 48 may be fed into machine 10 at input 46 to travel along the substantially straight copy path 24 without following any tortuous bends or significant curves as at 20, to thereby enhance survivability of substrate 100. Where machine 10 is the Model 210C mentioned above, a door (not shown) is provided behind guide 22 which allows access to guide 22 and alignment surface 44 thereof. Guide 22 of that machine is removable and, to that end, includes a handle 54 to facilitate removal and insertion. Guide 22 may therefore be removed to allow secure attachment of tray 48 thereto. Tray 48 may also utilize edge guides (not shown) to help align substrate 100 into input 46. Where tray 48 is metal, the edge guides may be magnetic bars. Further, in the Model 210C, alignment surface 44 is slightly curved but is short relative to the length of substrate sheet 100 and is thus still considered to be straight within the meaning of that term herein.

Additionally, and advantageously, substrate 100 should pass through machine 10 without heating same. To this end, heater 42 is either disabled or not included in machine 10. The Model 210C has a glossy paper mode of operation in which heater 42 is not energized.

Figure 2:
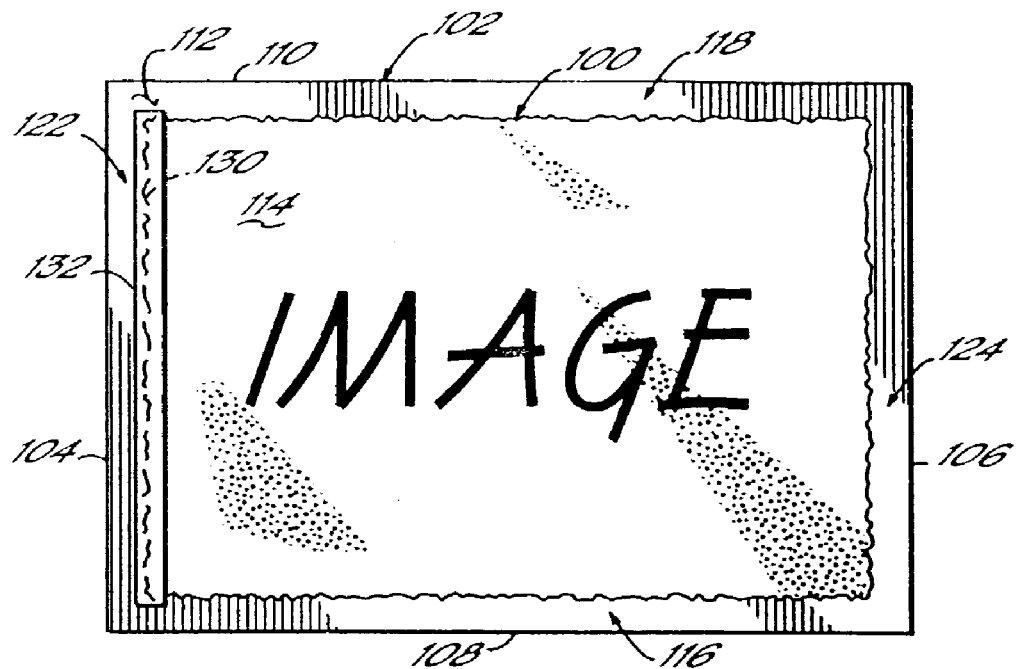
FIG. 2 is a top plan view of an edible substrate sheet for use with the machine of FIG. 1.

With reference to FIG. 2, there is shown an embodiment of a sheet of edible substrate 100 to which an image is to be applied by machine 10. Edible substrate sheet 100 is mounted to a carrier web 102 which is a blank sheet of wax film or silicone release paper. Carrier 102 is typically sized to replicate normal copy paper such as 8½ inch by 11 inch paper, or 210 millimeter by 297 millimeter (A4) paper. To this end, respective leading and trailing edges 104, 106 of carrier 102 are spaced eleven inches or 297 mm apart, and respective left and right side edges 108, 110 are spaced 8½ inches or 210 mm apart, to define an upper surface 112 thereof. Edible film substrate 100 is placed directly onto the upper surface 112 of carrier 102 with surface 114 facing up. Where sheet 100 has a high moisture content, the high moisture content helps to adhere substrate 100 to surface 112 carrier 102. Advantageously, substrate 100 is sized so that it does not extend all the way to the left or right edges 108, 110 of carrier 102 so as to leave an exposed strip 116, 118 along sides 108, 110, respectively. Also, substrate 100 may extend short of leading and/or trailing edges 104 and 106 of carrier 102 so as to define an exposed strip 122 and 124 thereat. For an 8½ inch by 11 inch carrier 102, substrate 100 would normally be dimensioned to about 7 inches by 10¼ inches and centered on surface 112. In this way, any traction mechanism (such as rollers 26 and 28) in machine 10 that grabs along the edges 108, 110 will not grab on to substrate 100 thereby reducing the likelihood of damage to substrate 100 and/or gumming up the traction mechanisms. Also, in any event, due to exposed strips 1116, 118, 122 and/or 124, there is less likelihood that any traction mechanism which initially grabs or helps propel the copy paper will become caught up or tangled in substrate 100 and thereby reduces the likelihood of damage to substrate 100 and/or gumming up of machine 10. To help protect substrate 100, the leading edge 130 of substrate 100 may have applied thereover a thin strip of polyester silicon adhesive tape 132 that extends onto edge 122. Tape 132 helps protect edge 130 from snagging and is particularly advantageous for use in photocopying machines where the paper path is curved as opposed to straight.

In use, edible substrate film 100 is placed on substrate support tray 48 and inserted into inlet 46, leading edge 104 or trailing edge 106 first, and with substrate sheet 100 face up (surface 114 up). The image 200 which is to be reproduced onto substrate 100 is placed face down on photocopy glass 12 and lid 60 thereof closed. Machine 10 is then activated in conventional manner (such as by depressing the copy button). As the image is scanned by unit 38, substrate 100 is pulled into machine 10 (with or without carrier 102) and it will traverse along alignment surface 44, into image reproducer area 34 whereat the image 200 scanned by unit 38 caused to be is reproduced onto the surface 114 of substrate 100 by conventional inkjet application of inks in cartridges 40A, 40B, 40C, and to 40D so as to produce a vivid color reproduction of image 200. Thereafter, substrate 100 passes out of machine 10 onto output tray 30 all while traveling along a substantially straight photocopy path.

Figure 3:
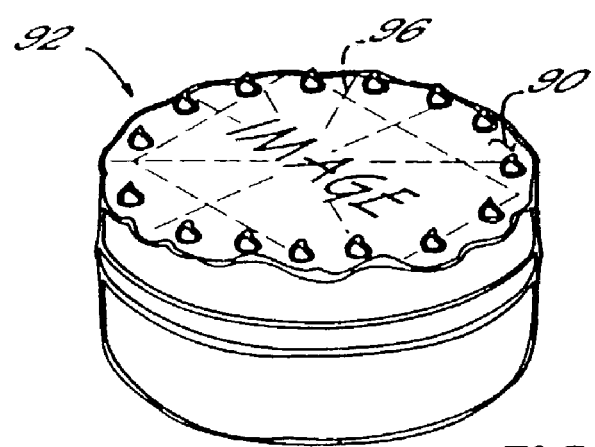
FIG. 3 is a perspective view of an iced cake with a decorated edible substrate sheet for purposes of describing the present invention.

After the image 200 is reproduced onto surface 114 of substrate 100, substrate 100 is removed from machine 10 and pealed from carrier 102 (if it was mounted thereto in the first place) and strip 132 removed or left behind on carrier 102 (if strip 132 was used). Substrate 100 is then laid, surface 114 up, onto the icing or frosting 90 of an iced baked good such as a cake 92 as shown in FIG. 3. Iced cake 92 may then be cut and served in any desired fashion by cutting through not only the cake and icing but also through substrate 100 as indicated by dashed lines 96. As substrate 100 and the inks forming the image thereon are edible, they may be consumed along with cake 92.

Advantageously, heater 42 is either disabled or not provided such that there is no substantial heating of substrate 100 as it traverses along the photocopy path 24 and thereby the deleterious effects of heating on substrate 100 are avoided. Further advantageously, substrate sheet 100 may be a web of high moisture content paper, such as disclosed in aforesaid U.S. Pat. No. 5,017,394 and available from The Lucks Company in Seattle, Wash.; or the edible paper described in U.S. patent application Ser. No. 09/166,492, filed Oct. 5, 1998, and entitled "Edible Paper and Method and Apparatus for Making Same", the disclosure of which is incorporated herein in its entirety by reference. Alternatively, sheet 100 may be a rigid edible substrate wafer available from Primus Ouwelfabriek B. V. of Zaandam, Holland. Where the web has a high moisture content or is not sufficiently rigid, substrate 100 is advantageously applied or mounted on carrier 102 as above-described such that carrier 102 and substrate 100 are carried together through the photocopy machine 10 along path 24. To this end, carrier 102 and substrate 100 are placed on substrate support tray 48 with substrate surface 114 facing upwardly to face image reproducer system 32 as substrate 100 passes through reproducer area 34. Alternatively, the web 100 may be introduced into machine 10 without carrier 102 if sheet 100 is sufficiently rigid. In any event, it will be appreciated that "web" as used herein is shorthand for a sheet of edible paper or the like.

As will be appreciated, the inks in cartridges 40A, 40B, 40C, and 40D must be nontoxic so that they do not render the edible substrate material essentially inedible. Advantageously, the inks are edible inks which include FDA approved FD&C dyes. The high moisture content of substrate 100 facilitates the absorption of the ink into the body of substrate 100. Further advantageously, inks containing an effective amount of isopropyl or ethyl alcohol which evaporates as substrate 100 passes out of machine 10 are used. Such inks also maintain sterility of the inks while in the cartridges 40A, 40B, 40C, and 40D and yet cause a fast drying effect of the ink applied to substrate 100. The basic formulation of such inks is 5% isopropyl or ethyl alcohol, 8% glycerin, FD&C food color as appropriate, with the balance comprised of distilled water.

By virtue of the foregoing there is thus provided a method of decorating iced baked goods that is simple, automated, and allows for a virtually limited range of custom and personalized designs.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art For example, while three color and one-black ink cartridges are shown, the color cartridges could be provided by a single tri-color ink cartridge. Moreover, conventional photocopiers utilizing toners rather then inks may be employed, if the toners produce edible images. Similarly, while the photocopy machine is shown as an integral unit, the scanning and image reproducer aspects need not be in the same housing. As will be appreciated, a characteristic of plain paper photocopy machines is that single button operation results in scanning of an image on the copy glass and reproduction of same on the web. Thus, where the scanning and image reproduction aspects are separate (within or without the same housing), but cooperate to produce the effect of a plain paper photocopy machine with, in essence, one button operation to scan and reproduce the image, the two aspects are deemed to define a photocopy machine as that term is used herein. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A method of decorating an iced bake good with a color image comprising:

obtaining a carrier with a generally flat piece of edible web mounted over at least a portion of one face thereof;

placing the carrier with the edible web in position to be carried through an ink-jet based reproducer mechanism, the ink-jet reproducer mechanism having edible inks and a non-tortuous path along which the carrier is to be transported without any portion of the edible web mounted thereon overlapping any other portion of the edible web, without any tortuous bends and without substantially heating the edible web;

selecting a color image;

placing the selected color image on a glass sheet;

after placing the carrier and selected color image, activating a single button to cause the following to automatically occur without activation of any further buttons by an operator:

scanning the selected color image through the glass sheet;

transporting the carrier with the edible web thereon along the non-tortuous path; and reproducing the color image scanned though the glass sheet onto the edible web with the edible inks as it passes along the non-tortuous path;

removing the carrier with the edible web having the reproduced image from the ink-jet reproducer mechanism;

removing the edible web with the reproduced image from the carrier; and placing the edible web on to said iced baked good with the reproduced image visible thereon.

2. A method of decorating an iced baked good with an image utilizing a scanner unit and an ink-jet based reproducer mechanism comprising:

utilizing an edible web on a carrier with the web extending short of at least one edge of the carrier to define an exposed strip of the carrier;

placing the image on a glass sheet of the scanner unit;

engaging the exposed strip on the carrier with a traction mechanism of the reproducer mechanism;

scanning the image through the glass sheet of the scanner unit;

passing the carrier and edible web from the traction mechanism towards an output of the reproducer mechanism along a non-tortuous path between the traction mechanism and the output, all without substantially heating the web; and reproducing with the reproducer mechanism the image scanned through the glass sheet of the scanner unit onto the edible web with an edible ink as it passes along the non-tortuous path, such reproducing being responsive to the scanner unit without the use of a separate electronic computer device to drive the reproducer mechanism.

3. The method of claim 2 further comprising placing the edible web with the image reproduced thereon onto said iced baked good.

4. A method of decorating an iced baked good with an image utilizing a scanner unit and an ink-jet based reproducer mechanism comprising:

placing the image on a glass sheet of the scanner unit;

scanning the image through the glass sheet of the scanner unit;

obtaining an edible web;

engaging the edible web with a traction mechanism of the reproducer mechanism;

passing the edible web from the traction mechanism towards an output of the reproducer mechanism along a non-tortuous path between the traction mechanism and the output, all without substantially heating the web; and reproducing with the reproducer mechanism the image scanned through the glass sheet of the scanner unit, onto the edible web with edible ink as it passes along the non-tortuous path, such reproducing being responsive to the scanner unit without going through a separate electronic computer device to drive the reproducer mechanism.

5. The method of decorating an iced baked good of claim 4 wherein the edible web is obtained on a carrier, engaging the edible web includes engaging the carrier, and passing the edible web along the non-tortuous path includes passing the carrier therealong.

6. The method of claim 4 further comprising placing the edible web with the image reproduced thereon onto said iced baked good.

7. A method of decorating an iced baked good with an image comprising:

placing an image to be reproduced on a glass sheet;

supplying an edible web to an ink-jet based reproducer mechanism having edible inks;

activating a single button to cause the following to automatically occur without activation of any further buttons by an operator:

scan the image through the glass sheet;

engage the edible web with a traction mechanism;

carry the edible web through the ink-jet based reproducer mechanism along a non-tortuous path from the traction mechanism toward an output without substantially heating the edible web; and reproduce the image scanned through the glass sheet onto the edible web with the edible inks as the edible web passes along the non-tortuous path.

8. The method of decorating an iced baked good of claim 7 wherein the edible web is obtained on a carrier, engaging the edible web includes engaging the carrier, and carrying the edible web along the non-tortuous path includes passing the carrier therealong.

9. The method of claim 8 further comprising, placing the edible web with the image thereon on to said iced baked good.

10. A method of decorating an iced bake good with a color image comprising:

obtaining a carrier with a generally flat piece of edible web mounted over at least a portion of one face thereof;

placing the carrier with the edible web in position to be carried through an ink-jet based reproducer mechanism, the ink-jet reproducer mechanism having edible inks, a traction mechanism for engaging the carrier with the edible web, and a non-tortuous path from the traction mechanism to an output along which the carrier is to be transported without substantially heating the edible web;

selecting a color image;

placing the selected color image on a glass sheet;

after placing the carrier and selected color image, activating a single button to cause the following to automatically occur without activation of any further buttons by an operator:

scanning the selected color image through the glass sheet;

engaging the carrier with the edible web;

transporting the carrier with the edible web thereon along the non-tortuous path from the traction mechanism to the output; and reproducing the color image scanned though the glass sheet onto the edible web with the edible inks as it passes along the non-tortuous path;

removing the carrier with the edible web having the reproduced image from the ink-jet reproducer mechanism;

removing the edible web with the reproduced image from the carrier; and placing the edible web on to said iced baked good with the reproduced image visible thereon.

* * * * *